(12) United States Patent
Yang et al.

(10) Patent No.: US 12,406,564 B2
(45) Date of Patent: Sep. 2, 2025

(54) DISPLAY DEVICE AND OPERATING METHOD FOR DISPLAY DEVICE

(71) Applicant: Wistron Corporation, New Taipei (TW)

(72) Inventors: Lei Yang, New Taipei (TW); Lei Sun, New Taipei (TW); Yuan Yuan Cai, New Taipei (TW); Junxin Qiu, New Taipei (TW); Wenlong Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 117 days.

(21) Appl. No.: 18/427,681

(22) Filed: Jan. 30, 2024

(65) Prior Publication Data

US 2025/0225855 A1 Jul. 10, 2025

(30) Foreign Application Priority Data

Jan. 4, 2024 (CN) .......................... 202410017738.2

(51) Int. Cl.
*G08B 21/00* (2006.01)
*G08B 21/18* (2006.01)

(52) U.S. Cl.
CPC .................... *G08B 21/18* (2013.01)

(58) Field of Classification Search
CPC ........... G08B 21/00; G08B 21/18; G06F 1/00; H01M 10/44; H01L 31/00; H02J 7/00; H02J 7/00714; H02J 7/007
See application file for complete search history.

(56) References Cited

U.S. PATENT DOCUMENTS

| | | | |
|---|---|---|---|
| 6,756,765 B2 * | 6/2004 | Bruning .............. | H02J 7/00034 320/108 |
| 7,793,121 B2 * | 9/2010 | Lawther .................. | H02J 50/80 713/300 |
| 10,310,576 B2 | 6/2019 | Ueki | |
| 10,460,674 B1 * | 10/2019 | Liu ...................... | G09G 3/2096 |
| 10,986,318 B2 * | 4/2021 | Zhang ..................... | H04N 9/31 |
| 11,424,637 B2 * | 8/2022 | Mei ....................... | H02J 7/0031 |
| 2003/0107482 A1 | 6/2003 | Kim | |

(Continued)

FOREIGN PATENT DOCUMENTS

| | | |
|---|---|---|
| TW | 201725475 | 7/2017 |
| TW | 202401945 | 1/2024 |

*Primary Examiner* — Toan N Pham
(74) *Attorney, Agent, or Firm* — JCIPRNET

(57) ABSTRACT

A display device includes a connection port, a determination circuit, a processor, and a tips circuit. In response to the connection port being connected to a transmission line, the determination circuit provides a first status signal, determines a power supply type of the transmission line, and provides a power supply type status value according to the power supply type. The processor reads the power supply type status value according to the first status signal, determines whether the power supply type meets an expected power supply type according to the power supply type status value, and provides a power supply type tips signal in response to the power supply type not meeting the expected power supply type. The tips circuit controls the display device to display a power supply type prompt image in response to the power supply type tips signal. An operating method for a display device is also disclosed.

20 Claims, 8 Drawing Sheets

(56) References Cited

U.S. PATENT DOCUMENTS

2014/0197804 A1\* 7/2014 Lin .................. H02J 7/007182
                                                    320/160
2017/0038810 A1    2/2017 Ueki \* cited by examiner

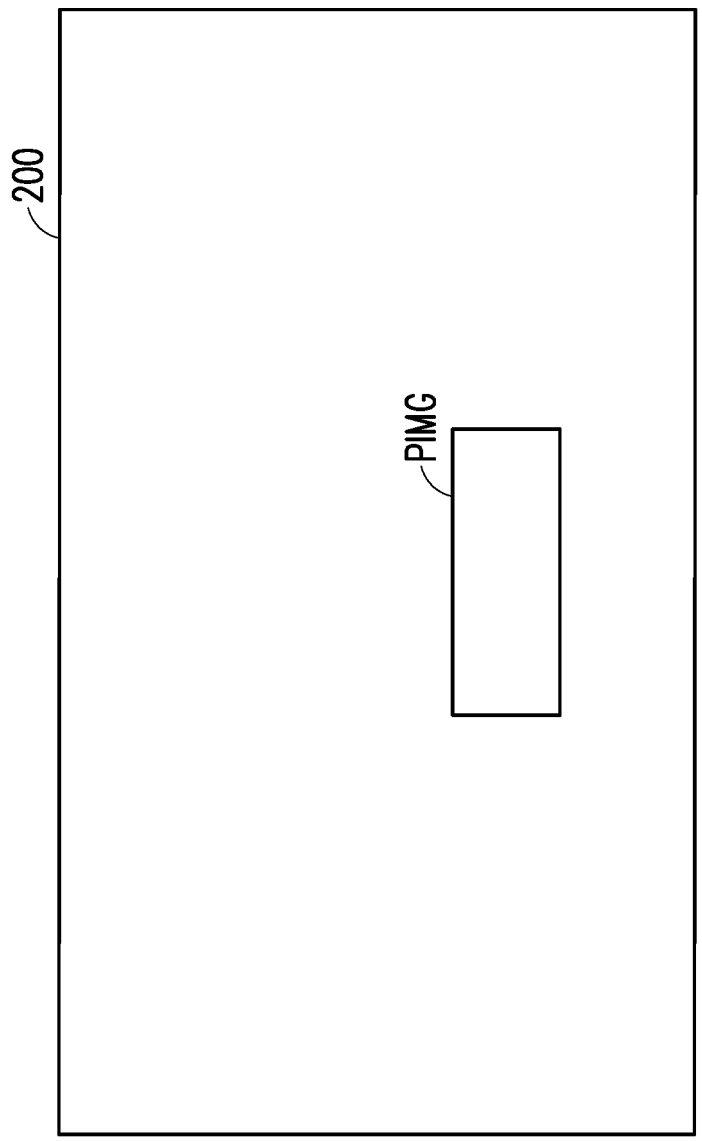

DISPLAY DEVICE AND OPERATING METHOD FOR DISPLAY DEVICE

CROSS-REFERENCE TO RELATED APPLICATION

This application claims the priority benefit of China application serial no. 202410017738.2, filed on Jan. 4, 2024. The entirety of the above-mentioned patent application is hereby incorporated by reference herein and made a part of this specification.

BACKGROUND

Technical Field

This disclosure relates to an electronic device and an operating method for an electronic device, and in particular to a display device and an operating method for a display device.

Description of Related Art

An existing display device may be connected to an electronic device by means of a transmission line. The display device may utilize the transmission line to provide power or data to the electronic device. The transmission line may be, for example, USB Type-C. It should be noted that the transmission line looks the same regardless of whether the Extended Power Range (EPR) specification is supported, making it indistinguishable to the user. For example, a user uses the transmission line to connect a display device to an electronic device and wishes to charge the electronic device with the 140 watts of power provided by the display device. If the transmission line does not support EPR, the display device cannot charge the electronic devices. There is no way for the user to know that the transmission line being used is one that does not support EPR. There is also no way for the user to know if the display device is charging the electronic device.

It is evident that providing a display device capable of determining and displaying the transmission line type is key research focus for one skilled in the art.

SUMMARY

The disclosure provides a display device and an operation method for a display device, capable of determining a type of a transmission line and displaying the type of the transmission line.

The display device of the disclosure includes a connection port, a determination circuit, a processor, and a tips circuit. The determination circuit is coupled to the connection port. In response to the connection port being connected to the transmission line, the determination circuit provides a first status signal, determines a power supply type of the transmission line, and provides a power supply type status value according to the power supply type. The processor is coupled to the determination circuit. The processor reads the power supply type status value according to a first status signal, determines whether the power supply type conforms to an expected power supply type according to the power supply type status value, and provides a power supply type tips signal in response to the power supply type not conforming to the expected power supply type. The tips circuit is coupled to the processor. The tips circuit controls the display device to display a power supply type prompt image according to the power supply type tips signal.

The operation method of the disclosure is adapted to a display device. The display device includes a connection port. The operation method includes the following. In response to the connection port being connected to a transmission line, a first status signal is provided, a power supply type of the transmission line is determined, and a power supply type status value is provided according to the power supply type. The power supply type status value is read according to the first status signal, whether the power supply type conforms to an expected power supply type is determined according to the power supply type status value. A power supply type tips signal is provided in response to the power supply type not conforming to the expected power supply type. The display device is controlled to display a power supply type prompt image according to the power supply type tips signal.

Based on the above, in response to the connection port being connected to the transmission line, the display device determines the power supply type of the transmission line. In response to the power supply type not conforming to the expected power supply type, the display device displays the power supply type prompt image. A user may know that the transmission line does not conform to the expected power supply type according to the power supply type prompt image displayed on the display device. In this way, the display device of the disclosure may improve the user experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

FIG. 8 is a schematic diagram of a prompt image according to an embodiment of the disclosure.

DESCRIPTION OF THE EMBODIMENTS

Some embodiments of the disclosure will be described in detail below with reference to the accompanying drawings. The numeral references described in the following description will be regarded as the same or similar elements when the same numeral reference appears in different drawings. These embodiments are only part of the disclosure and do not disclose all possible implementations of the disclosure. Rather, these embodiments are merely examples within the scope of the disclosure.

Figure 1:
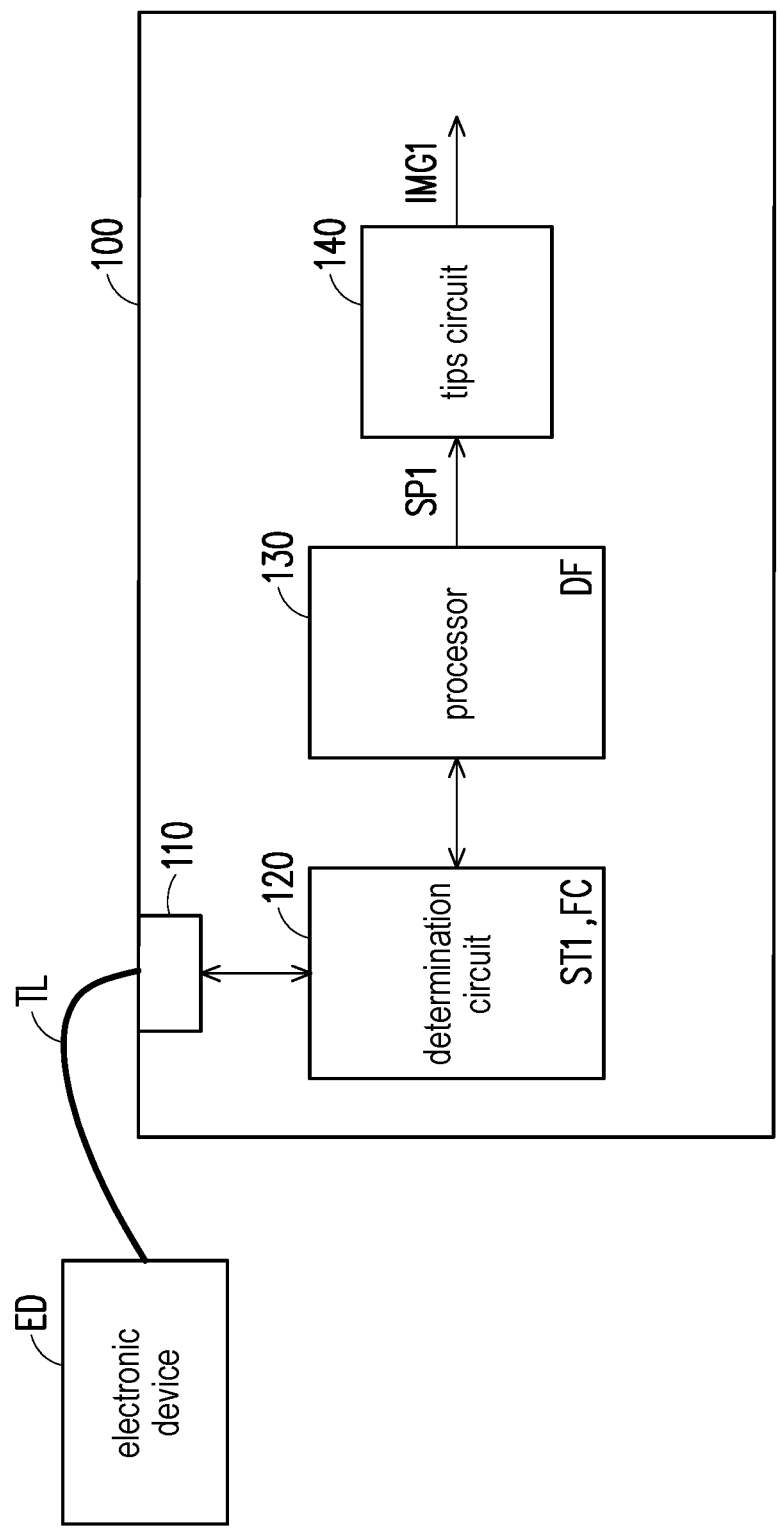
FIG. 1 is a schematic diagram of a display device according to an embodiment of the disclosure.

FIG. 1 is a schematic diagram of a display device according to an embodiment of the disclosure. In this embodiment, a display device 100 includes a connection port 110, a determination circuit 120, a processor 130, and a tips circuit 140. In this embodiment, the display device 100 may be any form of screen, monitor, or television. The display device 100 may power or charge an electronic device ED through the connection port 110. The electronic device ED may be a device that operates on electrical energy or a device that stores electrical energy.

In this embodiment, the determination circuit 120 is coupled to the connection port 110. In response to the connection port 110 being connected to a transmission line TL, the determination circuit 120 provides a first status signal ST1 and determines a power supply type of the transmission line TL. The determination circuit 120 provides a power supply type status value FC according to the power supply type. The power supply type status value FC records a status value of the power supply type of the transmission line TL.

In this embodiment, the processor 130 is coupled to the determination circuit 120. The processor 130 reads the power supply type status value FC according to the first status signal ST1, and determines whether the power supply type of the transmission line TL conforms to an expected power supply type DF according to the power supply type status value FC. In response to the power supply type of the transmission line TL not conforming to the expected power supply type DF, the processor 130 provides a power supply type tips signal SP1. The tips circuit 140 is coupled to the processor 130. The tips circuit 140 receives the power supply type tips signal SP1, and controls the display device 100 to display a power supply type prompt image IMG1 according to the power supply type tips signal SP1.

For example, the connection port 110 is a connection port with USB Type-C specifications. The expected power supply type DF is a power supply type that conforms to Extended Power Range (EPR). The power supply type of the transmission line TL conforming to the expected power supply type DF means that transmission line TL has the power supply type of EPR. As a result, the processor 130 does not provide the power supply type tips signal SP1. On the other hand, the power supply type of the transmission line TL not conforming to the expected power supply type DF means that the transmission line TL does not have the power supply type of the EPR. As a result, the processor 130 provides the power supply type tips signal SP1. The processor 130 may determine whether the transmission line TL conforms to the power supply type of EPR according to the current transmission line EPR capability.

It should be noted that, in response to the connection port 110 being connected to the transmission line TL, the display device 100 determines the power supply type of the transmission line TL. In response to the power supply type of the transmission line TL not conforming to the expected power supply type DF, the display device 100 displays the power supply type prompt image IMG1. The user can know that the transmission line TL is a transmission line that does not conform to the expected power supply type DF according to the power supply type prompt image IMG1 displayed on the display device 100. In this way, the display device 100 may improve the user experience.

The processor 130 is, for example, a central processing unit (CPU), or other programmable general-purpose or special-purpose microprocessor, digital signal processor (DSP), programmable controller, application specific integrated circuit (ASIC), programmable logic device (PLD), or other similar devices or combinations of these devices, which may load and execute computer programs.

Figure 2:
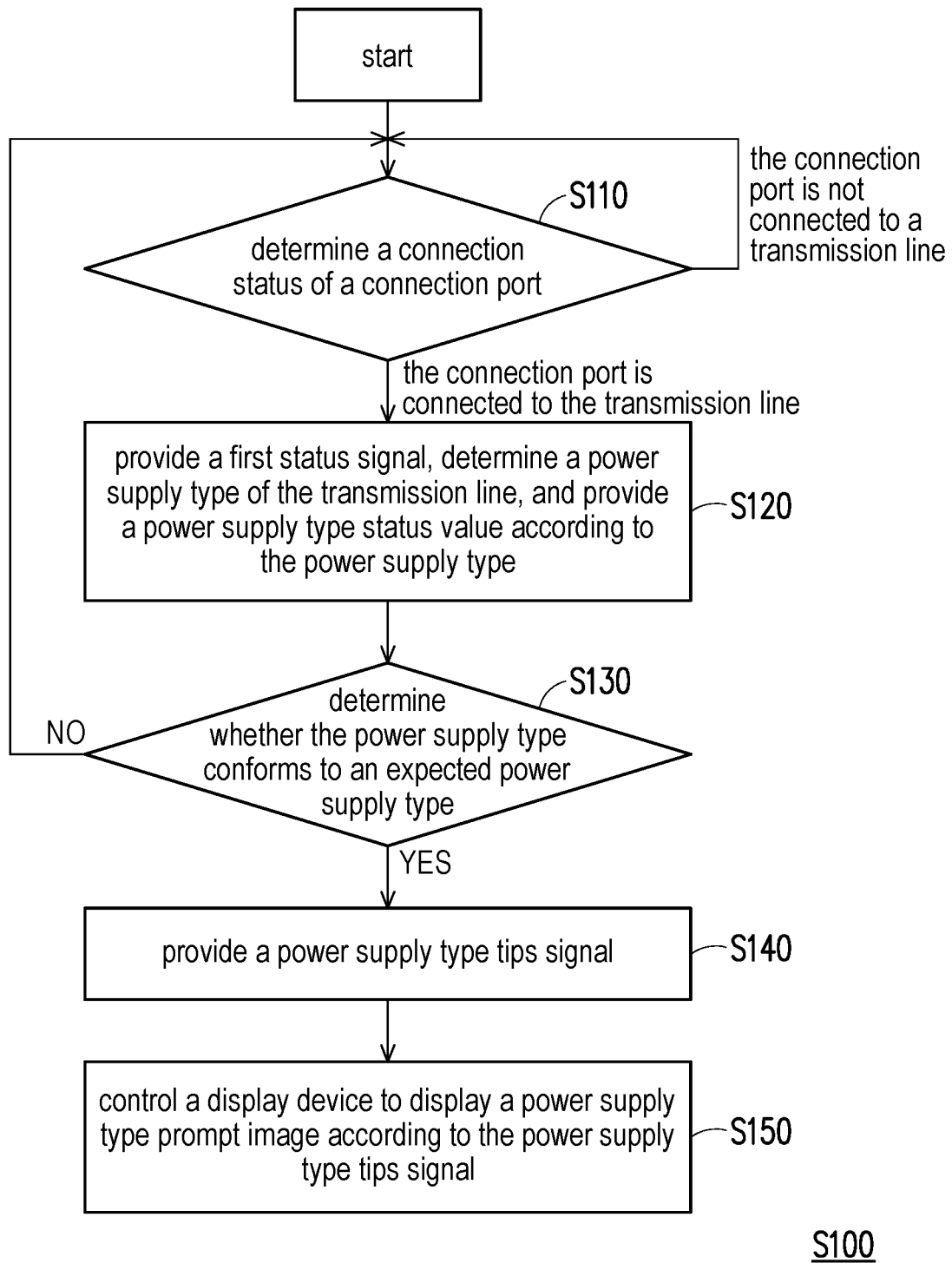
FIG. 2 is a flow chart of an operating method according to an embodiment of the disclosure.

Please refer to FIG. 1 and FIG. 2 simultaneously. FIG. 2 is a flow chart of an operating method according to an embodiment of the disclosure. In this embodiment, an operation method S100 is adapted to the display device 100. The operation method S100 includes steps S110 to S150. In step S110, the determination circuit 120 determines the connection status of the connection port 110. In step S120, in response to the connection port 110 being connected to the transmission line TL, the determination circuit 120 provides the first status signal ST1, determines the power supply type of the transmission line TL, and provides the power supply type status value FC according to the power supply type. On the other hand, in response to the connection port 110 not being connected to the transmission line TL, the operation method S100 returns to step S110.

In step S130, the processor 130 reads the power supply type status value FC according to the first status signal ST1, and determines whether the power supply type conforms to the expected power supply type DF according to the power supply type status value FC. In response to the power supply type not conforming to the expected power supply type DF, the processor 130 provides the power supply type tips signal SP1 in step S140. In step S150, the tips circuit 140 controls the display device 100 to display the power supply type prompt image IMG1 according to the power supply type tips signal SP1. The implementation example of step S130 is clearly explained in the embodiment of FIG. 1, and therefore will not be repeated in the following.

On the other hand, in step S130, in response to the power supply type being determined to conform to the expected power supply type DF, the operation method S100 returns to step S110.

Figure 3:
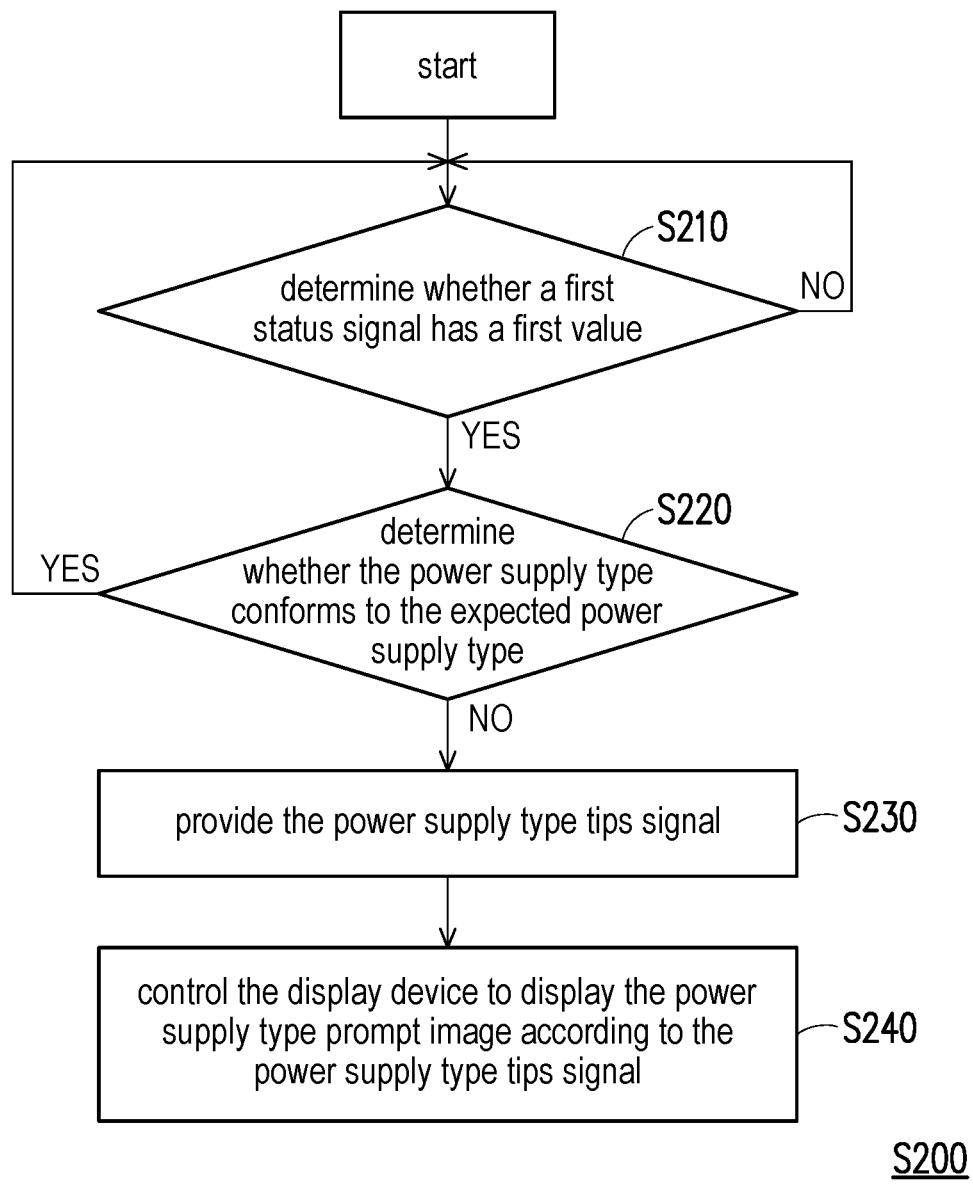
FIG. 3 is a flow chart of an operating method according to an embodiment of the disclosure.

Please refer to FIG. 1 and FIG. 3 simultaneously. FIG. 3 is a flow chart of an operating method according to an embodiment of the disclosure. In this embodiment, an operation method S200 is adapted to the display device 100. The operation method S200 includes steps S210 to S240. In step S210, the processor 130 reads the first status signal ST1 and determines a value (e.g., logic value or voltage level) of the first status signal ST1. In this embodiment, in response to the connection port 110 being connected to the transmission line TL or the transmission line TL being unplugged from the connection port 110, the determination circuit 120 provides the first status signal ST1 having a first value. In this embodiment, the "first value" is, for example, a logic low or a low voltage level. Step S210 may be a sub-step in step S110.

In response to the first status signal ST1 having the first value, the processor 130 reads the power supply type status value FC according to the first status signal ST1 having the first value, and changes the first status signal ST1 to a second value. In this embodiment, the "second value" is, for example, a logic high or a high voltage level.

In step S220, the processor 130 determines whether the power supply type of the connection port 110 conforms to the expected power supply type DF according to the power supply type status value FC. The power supply type of the connection port 110 conforming to the expected power supply type DF means that the connection port 110 is connected to the transmission line TL and conforms to the expected power supply type DF. As a result, the operation method S200 returns to step S210. On the other hand, in response to the power supply type of the connection port 110 not conforming to the expected power supply type DF, the processor 130 provides the power supply type tips signal SP1 in step S230. In step S240, the tips circuit 140 controls the display device 100 to display the power supply type prompt image IMG1 according to the power supply type tips signal SP1.

In step S210, the first status signal ST1 having the second value means that the connection status of the connection port 110 has not changed. As a result, the operation method S200 returns to step S210.

Figure 4:
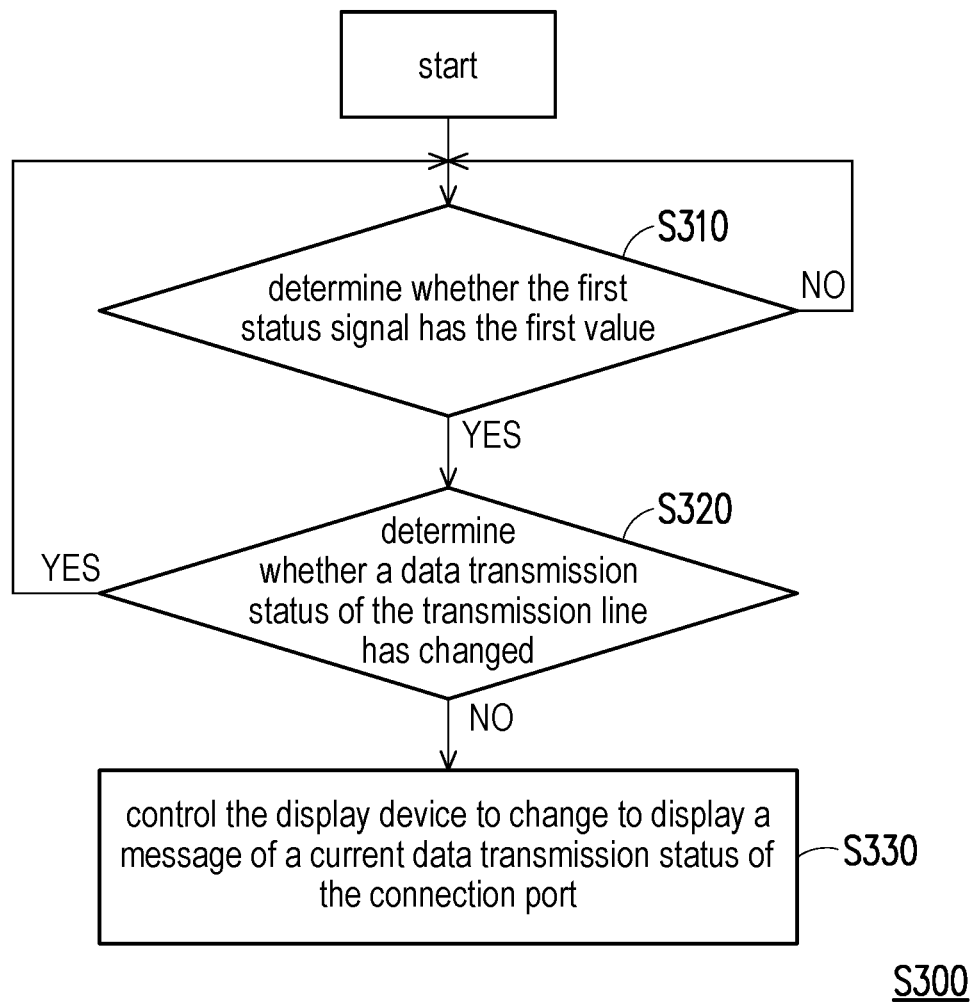
FIG. 4 is a flow chart of an operating method according to an embodiment of the disclosure.

Please refer to FIG. 1 and FIG. 4 simultaneously. FIG. 4 is a flow chart of an operating method according to an embodiment of the disclosure. In this embodiment, an operation method S300 is adapted to the display device 100. The operation method S300 includes steps S310 to S330. In step S310, the processor 130 reads the first status signal ST1 and determines the first status signal ST1 (e.g., logic value or voltage level). In response to the first status signal ST1 having the first value, the processor 130 reads the power supply type status value FC according to the first status signal ST1 having the first value, and changes the first status signal ST1 to the second value.

In step S320, the processor 130 determines whether a data transmission status of the transmission line TL has changed. In response to the data transmission status being changed, the processor 130 controls the tips circuit 140 so that the tips circuit 140 controls the display device 100 to change to display a message of a current data transmission status of the transmission line TL. In this embodiment, the data transmission status may be, for example, data transmission traffic and/or data transmission protocol (but the disclosure is not limited thereto). On the other hand, in response to the data transmission status not changing, the operation method S300 returns to step S310.

In step S310, the first status signal ST1 having the second value means that the connection status of the connection port 110 has not changed. As a result, the operation method S300 returns to step S310.

Figure 5:
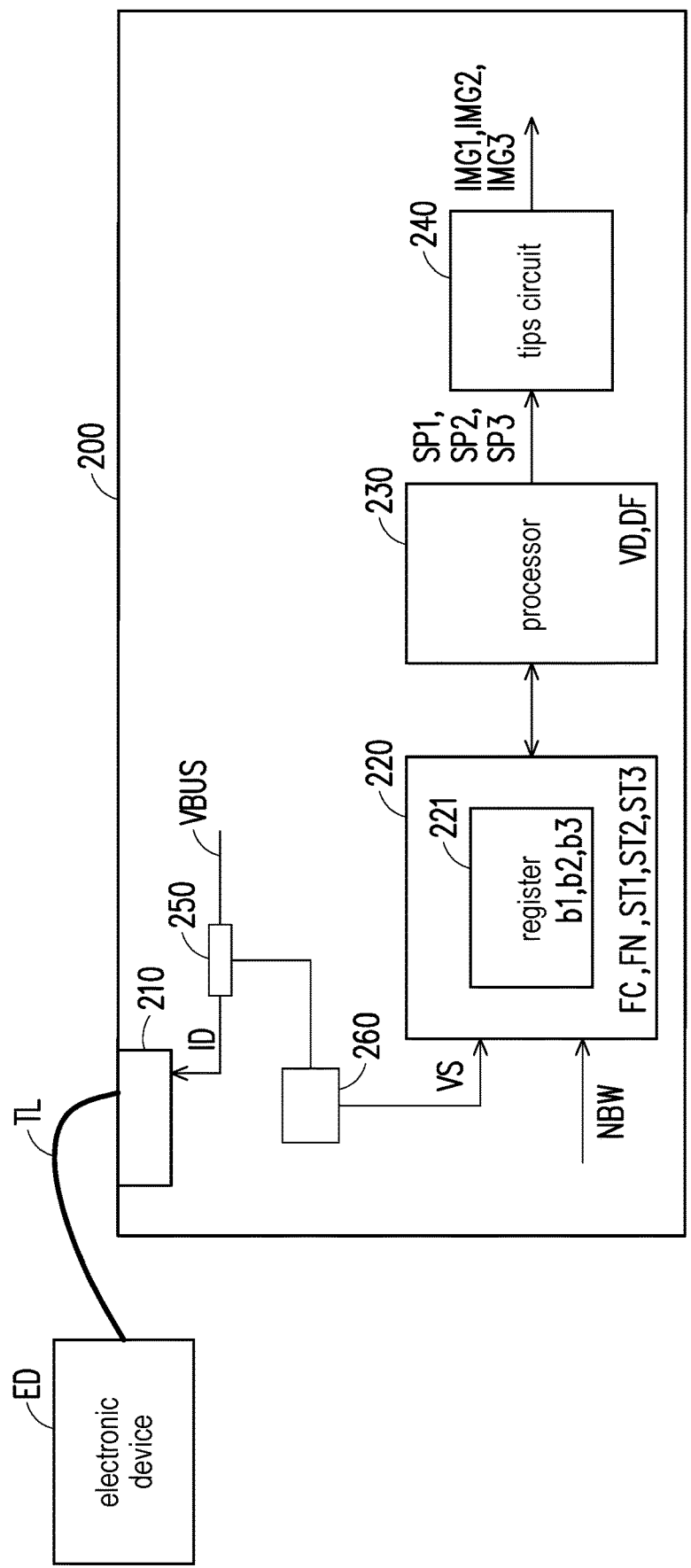
FIG. 5 is a schematic diagram of a display device according to an embodiment of the disclosure.

FIG. 5 is a schematic diagram of a display device according to an embodiment of the disclosure. In this embodiment, a display device 200 includes a connection port 210, a determination circuit 220, a processor 230, a tips circuit 240, a sensing resistor 250, and a sensor 260. The display device 200 may perform the operation method S100 in FIG. 2, the operation method S200 in FIG. 3, and the operation method S300 in FIG. 4.

In this embodiment, the determination circuit 220 detects a network connection status of the display device 200 and provides a bandwidth status value FN according to a bandwidth NBW of the network connection status. For example, the determination circuit 220 may detect the network connection status through the connection port 210 or other network connection ports. The processor 230 provides s bandwidth prompt signal SP2 according to the bandwidth status value FN. The tips circuit 240 controls the display device 200 to display a bandwidth prompt image IMG2 according to the bandwidth prompt signal SP2.

In this embodiment, the determination circuit 220 includes a register 221. The register 221 stores bit values b1, b2, and b3 of the bandwidth status value FN. For example, the relationship between the bit values b1, b2, b3 and the bandwidth NBW is shown in Table 1.

TABLE 1

| FN | NBW 10M | NBW 100M | NBW 1000M | uncon- nected | waveform 10M | waveform 100M | waveform 1000M | uncon- nected |
|---|---|---|---|---|---|---|---|---|
| b1 | 1 | 0 | 0 | 0 | L | H | H | H |
| b2 | 0 | 1 | 0 | 0 | H | L | H | H |
| b3 | 0 | 0 | 1 | 0 | H | H | L | H |

For example, in response to the bandwidth NBW being 10M bytes, the bit value b1 of the bandwidth status value FN is "1", the bit value b2 of the bandwidth status value FN is "0", and the bit value b3 of the bandwidth status value FN is "0". In response to the bandwidth NBW being 100M bytes, the bit value b1 of the bandwidth status value FN is "0", the bit value b2 of the bandwidth status value FN is "1", and the bit value b3 of the bandwidth status value FN is "0". In response to the bandwidth NBW being 1000M bytes, the bit value b1 of the bandwidth status value FN is "0", the bit value b2 of the bandwidth status value FN is "0", and the bit value b3 of the bandwidth status value FN is "1". In response to the display device 200 not being connected to the network, the bit values b1, b2, and b3 of the bandwidth status value FN are "0" respectively.

The processor 230 reads the bandwidth status value FN, and obtains waveforms corresponding to the bit values b1, b2, and b3 according to the bit values b1, b2, and b3 of the bandwidth status value FN. For example, in response to the processor 230 receiving a low voltage level "L" corresponding to the bit value b1, a high voltage level "H" corresponding to the bit value b2, and a high voltage level "H" corresponding to the bit value b3, the processor 230 knows that the bandwidth NBW is 10M bytes. The processor 230 provides the bandwidth prompt signal SP2 corresponding to the bandwidth NBW of 10M bytes.

In response to the processor 230 receiving the high voltage level "H" corresponding to the bit value b1, the low voltage level "L" corresponding to the bit value b2, and the high voltage level "H" corresponding to the bit value b3, the processor 230 knows that the bandwidth NBW is 100M bytes. The processor 230 provides the bandwidth prompt signal SP2 corresponding to the bandwidth NBW of 100M bytes.

In response to the processor 230 receiving the high voltage level "H" corresponding to the bit value b1, the high voltage level "H" corresponding to the bit value b2, and the low voltage level "L" corresponding to the bit value b3, the processor 230 knows that the bandwidth NBW is 1000M bytes, and provides the bandwidth prompt signal SP2 corresponding to the bandwidth NBW of 1000M bytes.

In addition, in response to the processor 230 receiving the high voltage level "H" corresponding to the bit value b1, the high voltage level "H" corresponding to the bit value b2, and the high voltage level "H" corresponding to the bit value b3, the processor 230 knows that the display device 200 is not connected to the network. The processor 230 provides the bandwidth prompt signal SP2 corresponding to the display device 200 not being connected to the network.

In some embodiments, the register 221 stores the bit values b0, b1, b2, and b3 of the bandwidth status value FN. For example, the relationship between the bit values b0, b1, b2, b3 and bandwidth NBW is shown in Table 2.

TABLE 2

| status | FN | | | |
| --- | --- | --- | --- | --- |
| | b3 | b2 | b1 | b0 |
| unconnected | 0 | 0 | 0 | 0 |
| 1000M | 1 | 1 | 0 | 0 |
| 100M | 1 | 0 | 1 | 0 |
| 10M | 1 | 0 | 0 | 1 |

For example, the bit value b3 being equal to "0" means that the display device 200 is not connected to the network. The bit value b3 being equal to "1" means that the display device 200 is connected to the network. In response to the bandwidth NBW being 1000M bytes, the bit value b2 is equal to "1", the bit value b1 is equal to "0", and the bit value b0 is equal to "0". In response to the bandwidth NBW being 100M bytes, the bit value b2 is equal to "0", the bit value b1 is equal to "1", and the bit value b0 is equal to "0". In response to the bandwidth NBW being 10M bytes, the bit value b2 is equal to "0", the bit value b1 is equal to "0", and the bit value b0 is equal to "1". Thus, the processor 230 receives the bit values b0, b1, b2, and b3 to determine the network connection status and the bandwidth NBW of the display device 200, and provides the bandwidth prompt signal SP2 corresponding to the network connection status and the bandwidth NBW.

Figure 6:
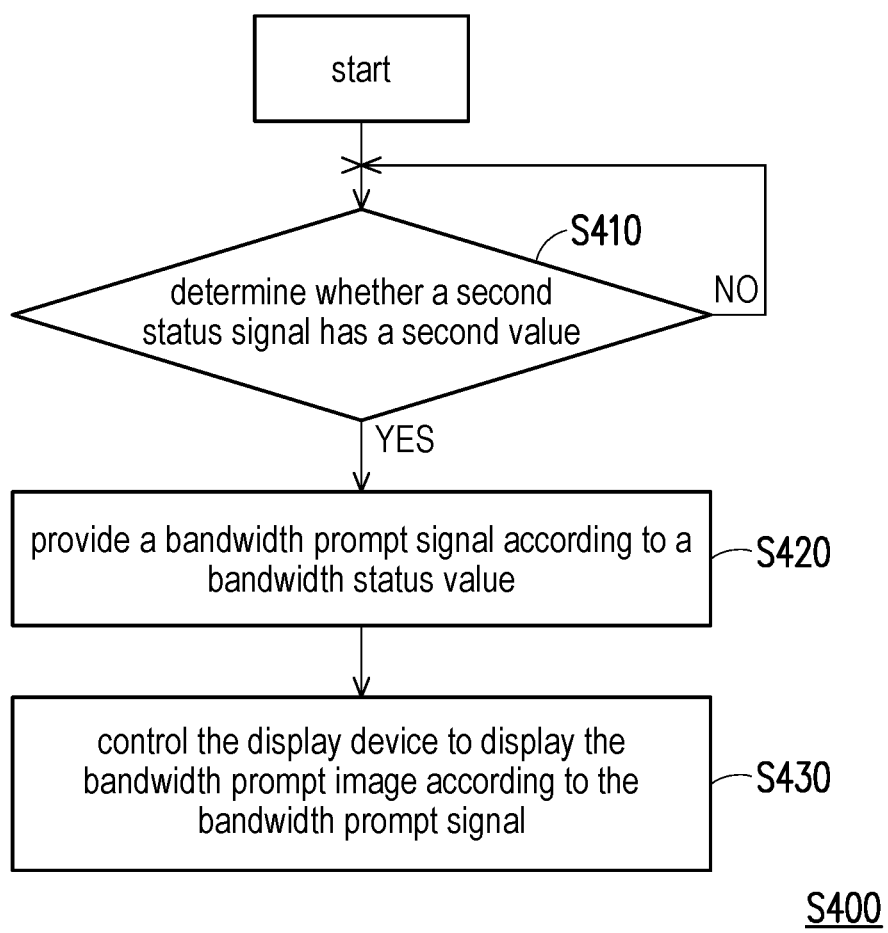
FIG. 6 is a flow chart of an operating method according to an embodiment of the disclosure.

Please refer to FIG. 5 and FIG. 6 simultaneously. FIG. 6 is a flow chart of an operating method according to an embodiment of the disclosure. In this embodiment, an operation method S400 is adapted to the display device 100. The operation method S400 includes steps S410 to S430. In step S410, the processor 130 reads a second status signal ST2 and determines a value (e.g., logic value or voltage level) of the second status signal ST2. In this embodiment, in response to the network connection status and/or bandwidth NBW being changed, the determination circuit 220 provides the second status signal ST2 having the first value. In this embodiment, the "first value" is, for example, a logic low or a low voltage level.

In response to the second status signal ST2 having the first value, the processor 130 reads the bandwidth status value FN according to the second status signal ST2 having the first value, and changes the second status signal ST2 to the second value. In this embodiment, the "second value" is, for example, a logic high or a high voltage level.

In step S420, the processor 130 provides the bandwidth prompt signal SP2 according to the bandwidth status value FN. In step S430, the tips circuit 240 controls the display device 100 to display the bandwidth prompt image IMG2 according to the bandwidth prompt signal SP2.

In step S410, the second status signal ST2 having the second value means that neither the network connection status nor the bandwidth NBW has changed. As a result, the operation method S400 returns to step S410.

Please return to the embodiment of FIG. 5. In this embodiment, the sensing resistor 250 is coupled to the connection port 210. A driving current ID flows through the connection port 210 and two ends of the sensing resistor 250. Specifically, taking this embodiment as an example, a first end of the sensing resistor 250 is coupled to the connection port 210 and a power line VBUS in the display device 200. A second end of the sensing resistor 250 is coupled to the connection port 210. The display device 200 uses the power line VBUS to provide power to the connection port 210 and the transmission line TL, thereby powering or charging the electronic device ED.

The sensor 260 is coupled to the sensing resistor 250 and the determination circuit 220. The sensor 260 senses a voltage difference VS between the two ends of the sensing resistor 250. In this embodiment, the sensor 260 receives a first voltage value at the first end of the sensing resistor 250 and a second voltage value at the second end of the sensing resistor 250. The sensor 260 subtracts the second voltage value from the first voltage value to obtain the voltage difference VS, and provides the voltage difference VS to the determination circuit 220. The voltage difference VS is proportional to a current value of the driving current ID.

The processor 230 receives the voltage difference VS through the determination circuit 220 and determines the voltage difference VS. The voltage difference VS being greater than a predetermined value VD means that the current value of the driving current ID is too high. The processor 230 provides an over-current prompt signal SP3. The tips circuit 240 controls the display device 200 to display an over-current prompt image IMG3 according to the over-current prompt signal SP3. On the other hand, in response to the voltage difference VS being less than or equal to the predetermined value VD, the processor 230 does not provide the over-current prompt signal SP3.

Figure 7:
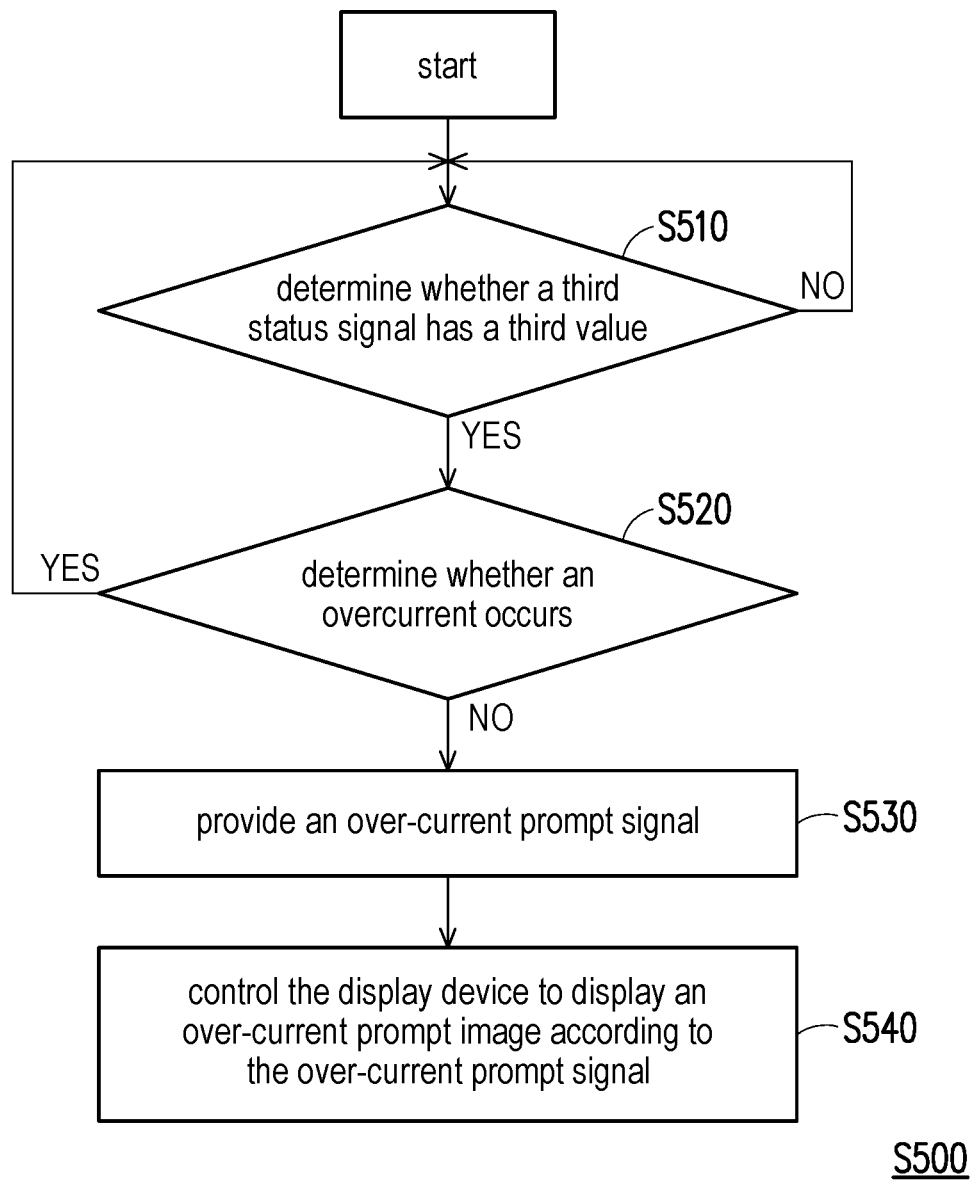
FIG. 7 is a flow chart of an operating method according to an embodiment of the disclosure.

Please refer to FIG. 5 and FIG. 7 simultaneously. FIG. 7 is a flow chart of an operating method according to an embodiment of the disclosure. In this embodiment, an operation method S500 is adapted to the display device 100. The operation method S500 includes steps S510 to S540. In step S510, the processor 230 reads a third status signal ST3 and determines a value (e.g., logic value or voltage level) of the third status signal ST3. In this embodiment, in response to the voltage difference VS being changed, the determination circuit 220 provides the third status signal ST3 having the first value. In this embodiment, the "first value" is, for example, a logic low or a low voltage level.

In response to the third status signal ST3 having the first value, the processor 230 receives the voltage difference VS according to the third status signal ST3 having the first value, and then change the third status signal ST3 to the second value. In this embodiment, the "second value" is, for example, a logic high or a high voltage level.

In step S520, the processor 230 determines the voltage difference VS. In response to the voltage difference VS being less than or equal to the predetermined value VD, the operation method S500 returns to step S510. On the other hand, in response to the voltage difference VS being greater than the predetermined value VD, the processor 230 provides the over-current prompt signal SP3 in step S530. In step S540, the tips circuit 240 controls the display device 200 to display the over-current prompt image IMG3 according to the over-current prompt signal SP3.

In step S510, the third status signal ST3 having the second value means that the voltage difference VS has not changed. As a result, the operation method S500 returns to step S510. Please refer to FIG. 5 and FIG. 8 simultaneously. FIG. 8 is a schematic diagram of a prompt image according to an embodiment of the disclosure. In this embodiment, the display device 200 may display a prompt window PIMG. The prompt window PIMG is, for example, a "pop-up" displaying at least one of the power supply type prompt image IMG1, the bandwidth prompt image IMG2, and the over-current prompt image IMG3 (but the disclosure is not limited thereto). In this way, the user may know that the transmission line TL is a transmission line that does not conform to the expected power supply type DF according to the power supply type prompt image IMG1 displayed on the display device 200. The user may know the network connection status of the display device 200 according to the bandwidth prompt image IMG2 displayed on the display device 200. The user may know that an overcurrent occurs in the display device 200 according to the over-current prompt image IMG3 displayed on the display device 200.

In some embodiments, the display device 200 may display at least one of the power supply type prompt image IMG1, the bandwidth prompt image IMG2, and the over-current prompt image IMG3 using an on-screen display (OSD).

In summary, in response to the connection port being connected to the transmission line, the display device determines the power supply type of the transmission line. In response to the power supply type not conforming to the expected power supply type, the display device displays the power supply type prompt image. A user may know that the transmission line does not conform to the expected power supply type according to the power supply type prompt image displayed on the display device. In addition, the display device may also display the bandwidth prompt image and the over-current prompt image. The user may know the network connection status of the display device according to the bandwidth prompt image displayed on the display device. The user may know that an overcurrent occurs in the display device according to the over-current prompt image displayed on the display device. In this way, the display device of the disclosure may improve the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:
   a connection port;
   a determination circuit, coupled to the connection port and configured to, in response to the connection port being connected to a transmission line, provide a first status signal, determine a power supply type of the transmission line, and provide a power supply type status value according to the power supply type;
   a processor, coupled to the determination circuit, configured to read the power supply type status value according to the first status signal, determine whether the power supply type conforms to an expected power supply type according to the power supply type status value, and provide a power supply type tips signal in response to the power supply type not conforming to the expected power supply type; and
   a tips circuit, coupled to the processor, configured to control the display device to display a power supply type prompt image according to the power supply type tips signal.

2. The display device according to claim 1, wherein:
   in response to the connection port being connected to the transmission line, the determination circuit provides the first status signal having a first value, and
   the processor reads the power supply type status value according to the first status signal having the first value, and changes the first status signal to a second value.

3. The display device according to claim 1, wherein the expected power supply type is a power supply type conforming to an Extended Power Range.

4. The display device according to claim 1, wherein:
   in response to the connection port being connected to the transmission line, the determination circuit determines a data transmission status of the transmission line,
   the processor reads the data transmission status according to the first status signal, and determines whether the data transmission status has changed, and
   in response to the data transmission status being changed, the processor controls the tips circuit such that the tips circuit controls the display device to change to display a message of a current data transmission status of the connection port.

5. The display device according to claim 1, wherein the determination circuit detects a network connection status of the display device and provides a bandwidth status value according to a bandwidth of the network connection status.

6. The display device according to claim 5, wherein:
   the processor provides a bandwidth prompt signal according to the bandwidth status value, and
   the tips circuit controls the display device to display a bandwidth prompt image according to the bandwidth prompt signal.

7. The display device according to claim 5, wherein the determination circuit comprises:
   a register, configured to store a plurality of bit values of the bandwidth status value.

8. The display device according to claim 5, wherein:
   in response to the network connection status being changed, the determination circuit provides a second status signal having a first value, and
   the processor reads the bandwidth status value according to the second status signal having the first value, and changes the second status signal to a second value.

9. The display device according to claim 1 further comprising:
   a sensing resistor, coupled to the connection port, wherein a driving current flows through the connection port and the sensing resistor; and
   a sensor, coupled between the sensing resistor and the determination circuit, configured to sense a voltage difference between two ends of the sensing resistor and provide the voltage difference to the determination circuit.

10. The display device according to claim 9, wherein:
    in response to the voltage difference being greater than a predetermined value, the processor provides an over-current prompt signal, and
    the tips circuit controls the display device to display an over-current prompt image according to the over-current prompt signal.

11. The display device according to claim 9, wherein:
    in response to the voltage difference being changed, the determination circuit provides a third status signal having a first value, and
    the processor receives the voltage difference according to the third status signal having the first value, and changes the third status signal to a second value.

12. An operating method for a display device, wherein the display device comprises a connection port, wherein the operating method comprises:
    in response to the connection port being connected to a transmission line, providing a first status signal, determining a power supply type of the transmission line, and providing a power supply type status value according to the power supply type;
    reading the power supply type status value according to the first status signal, determining whether the power supply type conforms to an expected power supply type according to the power supply type status value;

providing a power supply type tips signal in response to the power supply type not conforming to the expected power supply type; and controlling the display device to display a power supply type prompt image according to the power supply type tips signal.

13. The operating method according to claim 12, wherein:
providing the first status signal comprises:
   in response to the connection port being connected to the transmission line, providing the first status signal having a first value, and
the operating method further comprises:
   reading the power supply type status value in response to the first status signal having the first value, and changing the first status signal to a second value.

14. The operation method according to claim 12, wherein the expected power supply type is a power supply type conforming to an Extended Power Range.

15. The operation method according to claim 12 further comprising:
   in response to the connection port being connected to the transmission line, determining a data transmission status of the transmission line,
   reading the data transmission status according to the first status signal, and determining whether the data transmission status has changed; and
   in response to the data transmission status being changed, controlling the display device to change to display a message of a current data transmission status of the connection port.

16. The operation method according to claim 12 further comprising:
   detecting a network connection status of the display device and providing a bandwidth status value according to a bandwidth of the network connection status.

17. The operation method according to claim 16 further comprising:
   providing a bandwidth prompt signal according to the bandwidth status value; and
   controlling the display device to display a bandwidth prompt image according to the bandwidth prompt signal.

18. The operating method according to claim 16 further comprising:
   in response to the network connection status being changed, providing a second status signal having a first value; and
   reading the bandwidth status value in response to the second status signal having the first value, and changing the second status signal to a second value.

19. The operation method according to claim 18 further comprising:
   in response to the network connection status being changed, providing a third status signal having a first value; and
   reading the bandwidth status value in response to the third status signal having the first value, and changing the third status signal to a second value.

20. The operating method according to claim 12, wherein the display device further comprises a sensing resistor coupled to the connection port, wherein a driving current flows through the connection port and the sensing resistor, and the operation method comprises:
   receiving a voltage difference between two ends of the sensing resistor;
   in response to the voltage difference being greater than a predetermined value, providing an over-current prompt signal; and
   controlling the display device to display an over-current prompt image according to the over-current prompt signal.

* * * * *